US011203324B2

(12) United States Patent
Schroll et al.

(10) Patent No.: US 11,203,324 B2
(45) Date of Patent: Dec. 21, 2021

(54) SYSTEMS AND METHODS FOR REMOTELY LOCKING AND UNLOCKING VEHICLE ACCESSORY LOCKS

(71) Applicant: The Eastern Company, Naugatuck, CT (US)

(72) Inventors: Matthew Schroll, Glendale Heights, IL (US); James C. Fournier, Gurnee, IL (US)

(73) Assignee: The Eastern Company, Naugatuck, CT (US)

( * ) Notice: Subject to any disclaimer, the term of this patent is extended or adjusted under 35 U.S.C. 154(b) by 0 days.

(21) Appl. No.: 16/708,880

(22) Filed: Dec. 10, 2019

(65) Prior Publication Data

US 2020/0198578 A1 Jun. 25, 2020

Related U.S. Application Data

(60) Provisional application No. 62/782,705, filed on Dec. 20, 2018.

(51) Int. Cl.
*B60R 25/24* (2013.01)
*G07C 9/00* (2020.01)
*H04W 4/80* (2018.01)

(52) U.S. Cl.
CPC ........ *B60R 25/245* (2013.01); *G07C 9/00309* (2013.01); *H04W 4/80* (2018.02);
(Continued)

(58) Field of Classification Search
CPC ............ B60R 25/245; B60R 2325/101; B60R 2325/205; B60R 25/001; B60R 25/24;
(Continued)

(56) References Cited

U.S. PATENT DOCUMENTS 4,702,095 A 10/1987 Ben-Asher
4,823,059 A 4/1989 Compeau et al.
(Continued)

FOREIGN PATENT DOCUMENTS

KR 10-2013-0087264 A 8/2013

OTHER PUBLICATIONS

"Leer shell/cap—really cool remote entry using existing key fob," online discussion downloaded from the Internet at https://www.ridgelineownersclub.com/threads/leer-shell-cap-really-cool-remote-entry-using-existing-key-fob.499/ on Sep. 5, 2019, 11 pp.
(Continued)

*Primary Examiner* — Edwin C Holloway, III
(74) *Attorney, Agent, or Firm* — Leydig, Voit & Mayer, Ltd.

(57) ABSTRACT

Systems and methods for remotely locking and unlocking vehicle accessory locks of vehicle accessories positioned on a vehicle are disclosed. The vehicle includes main doors with locks that are remotely lockable and unlockable using main door lock actuators. Vehicle includes a vehicle controller that receives a user signal from a user, first determines a main door actuation command based on the first signal, and first transmits, based on the main door actuation command, a first actuation command signal to the main door lock actuators. The system includes accessory lock actuator(s) operably coupled to the accessory lock(s), accessory lock controller(s) operably coupled to the accessory lock actuator(s), and a gateway controller operably coupled to the vehicle controller. Gateway controller second determines an accessory lock actuation command based on the first actuation command signal, and second transmits, based on the accessory lock actuation command, a gateway signal to the accessory lock controller.

19 Claims, 13 Drawing Sheets

(52) U.S. Cl.
CPC ... *B60R 2325/101* (2013.01); *B60R 2325/205* (2013.01); *G07C 2009/00515* (2013.01); *G07C 2009/00539* (2013.01); *G07C 2009/00984* (2013.01)

(58) Field of Classification Search
CPC ..... B60R 9/058; H04W 4/80; G07C 9/00309; G07C 2009/00515; G07C 2009/00539; G07C 2009/00984; G07C 2209/10; G07C 2009/00206; G07C 2009/00214; G07C 2009/00222; G07C 2209/62; G07C 2009/00793; G07C 9/00896; G07C 9/00182; B62D 33/037
USPC ...................................................... 340/5.72
See application file for complete search history.

(56) References Cited

U.S. PATENT DOCUMENTS

| | | | |
|---|---|---|---|
| 4,979,384 A | 12/1990 | Malesko et al. | |
| 5,123,691 A * | 6/1992 | Ginn | B60R 9/00 292/201 |
| 5,247,817 A | 9/1993 | Körner et al. | |
| 5,382,948 A * | 1/1995 | Richmond | B60R 25/04 180/287 |
| 5,531,086 A | 7/1996 | Bryant | |
| 5,828,316 A * | 10/1998 | DiCroce | B60R 25/24 340/12.22 |
| 5,896,769 A | 4/1999 | Elpern et al. | |
| 5,905,431 A * | 5/1999 | Mueller | B60R 25/1003 340/426.17 |
| 5,907,195 A * | 5/1999 | Issa | B60R 25/24 307/10.3 |
| 5,912,631 A * | 6/1999 | Kusunoki | G07C 9/00182 340/5.64 |
| 6,030,019 A | 2/2000 | Stiltner et al. | |
| 6,032,500 A | 3/2000 | Collard, Jr. et al. | |
| 6,048,002 A | 4/2000 | Ohta et al. | |
| 6,297,731 B1 | 10/2001 | Flick | B60R 16/03 180/287 |
| 6,354,650 B2 * | 3/2002 | Terhaar | B60J 1/14 292/DIG. 29 |
| 6,676,174 B2 | 1/2004 | Reynolds et al. | |
| 7,040,675 B1 | 5/2006 | Ott et al. | |
| 7,256,691 B2 | 8/2007 | Awobue | |
| 7,363,786 B2 | 4/2008 | TerHaar et al. | |
| 8,029,029 B2 | 10/2011 | Terhaar et al. | |
| 8,419,083 B2 | 4/2013 | Burmesch | |
| 8,453,481 B2 | 6/2013 | Meekma | |
| 8,474,290 B2 | 7/2013 | Terhaar et al. | |
| 8,674,832 B1 | 3/2014 | Thomas | |
| 8,952,782 B2 | 2/2015 | Kilbourne | |
| 9,151,078 B2 | 10/2015 | Lackey | |
| 9,455,839 B2 | 9/2016 | Conrad et al. | |
| 9,501,046 B2 | 11/2016 | Kalous et al. | |
| 9,536,365 B2 | 1/2017 | Wisnia | |
| 9,600,696 B2 | 3/2017 | Ebner | |
| 10,053,891 B1 * | 8/2018 | Williams | E05B 73/00 |
| 10,118,473 B2 | 11/2018 | McDonald, II et al. | |
| 10,794,095 B2 | 10/2020 | Schroll | |
| 2003/0169159 A1 * | 9/2003 | Flick | B60R 25/04 340/426.1 |
| 2004/0061597 A1 * | 4/2004 | Thompson | G07C 9/00182 340/426.28 |
| 2004/0150509 A1 * | 8/2004 | Dunn | B60R 25/00 340/5.72 |
| 2004/0195857 A1 | 10/2004 | Chverchko et al. | |
| 2005/0029832 A1 | 2/2005 | Verduci et al. | |
| 2005/0040969 A1 * | 2/2005 | Heyn | B60R 16/0315 340/12.22 |
| 2006/0220806 A1 * | 10/2006 | Nguyen | B60R 25/102 340/426.36 |
| 2007/0096498 A1 | 5/2007 | Kim | |
| 2010/0257786 A1 | 10/2010 | Rock | |
| 2011/0175375 A1 | 7/2011 | Terhaar et al. | |
| 2012/0173051 A1 * | 7/2012 | Tarnutzer | H04L 12/4625 701/2 |
| 2016/0012653 A1 * | 1/2016 | Soroko | G07C 5/0808 340/5.61 |
| 2017/0259654 A1 * | 9/2017 | McDonald, II | E05B 47/0001 |
| 2017/0297518 A1 * | 10/2017 | Hatton | B60R 16/037 |
| 2019/0061499 A1 | 2/2019 | McDonald, II et al. | |
| 2019/0128042 A1 | 5/2019 | Junod | |
| 2020/0130485 A1 | 4/2020 | Ireland et al. | |
| 2020/0198559 A1 | 6/2020 | Krosschell et al. | |

OTHER PUBLICATIONS

Pop & Lock, "Power Tailgate Lock Instructions," Model PL8200 product brochure, 2 pp.

etrailer.com, "Pop & Lock Power Locking Handle for Truck Caps and Hard Tonneau Covers," product page downloaded from the Internet at https://www.etrailer.com/Vehicle-locks/Pop-and-Lock/PAL9555.html on Sep. 5, 2019, 3 pp.

* cited by examiner

SYSTEMS AND METHODS FOR REMOTELY LOCKING AND UNLOCKING VEHICLE ACCESSORY LOCKS

CROSS-REFERENCE TO RELATED APPLICATIONS

This patent application claims the benefit of, and priority to, U.S. Provisional Patent Application No. 62/782,705, filed Dec. 20, 2018, which is incorporated by reference herein in its entirety.

BACKGROUND

Vehicle accessories of various types provide vehicle users convenient ways to extend the usefulness of their vehicles. In many such accessories employed by users on their vehicles, the vehicle accessories include locks for securing the accessory to the vehicle and/or securing contents being stored in or on the accessories.

In at least some known vehicle accessories, accessory locks are power locks. In such examples, use of the accessory power locks may require users to carry more than one key fob with their vehicle ignition key. In other known examples, hard wiring of the power accessory locks to the vehicle's battery requires running wires through the body of the vehicle, which not only require labor-intensive procedures and numerous additional parts beside the accessory and accessory locks themselves, but also may void vehicle warranties for such issues as body corrosion.

Therefore, a need exists in the field of lockable vehicle accessories for devices, systems, and methods for remotely locking and unlocking vehicle accessory locks that provide users more convenience, that are less expensive and less time-consuming to install, that are easier to operate and maintain, that require fewer modifications to vehicles to which they are attached and/or to the vehicle accessories themselves, and which make attaching the vehicle accessories to vehicles less likely to violate vehicle warranty conditions.

SUMMARY

In one aspect, the disclosure describes a method for remotely locking and unlocking a vehicle accessory positioned on, or in, a vehicle. The accessory has at least one accessory lock. The vehicle includes one or more main doors having remotely lockable and unlockable main door locks. The method includes receiving, at a vehicle controller positioned in or on the vehicle, a user signal from a vehicle user positioned inside or outside the vehicle. The method also includes first determining, by the vehicle controller and based on the user signal, a main door actuation command. The method further includes first transmitting, by the vehicle controller and based on the determined main door actuation command, a first actuation command signal to one or more main door lock actuators. The method also includes second determining, by a gateway controller operably coupled to the vehicle controller, an accessory lock actuation command based on the transmitted first actuation command signal. The method further includes second transmitting, by the gateway controller and based on the determined accessory lock actuation command, a gateway signal to at least one accessory lock controller positioned on, in, or proximal the vehicle accessory and operably coupled to at least one accessory lock actuator.

In another aspect, the disclosure describes a system for remotely locking and unlocking one or more vehicle accessories positioned on, or in, a vehicle. The one or more vehicle accessories have at least one accessory lock. The vehicle includes one or more main doors having remotely lockable and unlockable main door locks. The vehicle also includes one or more main door lock actuators operably coupled to the main door locks. The vehicle further includes a vehicle controller positioned in or on the vehicle. The vehicle controller is configured to receive a user signal from a vehicle user positioned inside or outside the vehicle. The vehicle controller is also configured to first determine, based on the user signal, a main door actuation command. The vehicle controller is further configured to first transmit, based on the determined main door actuation command, a first actuation command signal to the one or more main door lock actuators. The system includes at least one accessory lock actuator operably coupled to the at least one accessory lock. The system also includes at least one accessory lock controller operably coupled to the at least one accessory lock actuator. The system includes a gateway controller operably coupled to the vehicle controller. The gateway controller is configured to second determine an accessory lock actuation command based on the transmitted first actuation command signal. The gateway controller is also configured to second transmit, based on the determined accessory lock actuation command, a gateway signal to the at least one accessory lock controller.

In yet another aspect, the disclosure describes a non-transient corn puter-readable storage medium storing processor-executable instructions for remotely locking and unlocking one or more vehicle accessories positioned on, or in, a vehicle. When executed by one or more processors, the processor-executable instructions cause the one or more processors to determine an accessory lock actuation command based on a transmitted first actuation command signal transmitted by a vehicle controller of the vehicle to one or more main door lock actuators operably coupled to one or more vehicle main doors of the vehicle. When executed by the one or more processors, the processor-executable instructions also cause the one or more processors to transmit, based on the determined accessory lock actuation command, a gateway signal to at least one accessory lock controller operably coupled to at least one accessory lock of the one or more vehicle accessories.

In still another aspect, the disclosure describes a method for remotely locking and unlocking vehicle accessory locks. Method includes selecting, by a system user, a command using an input device such as a graphical user interface displayed to the user by way of a display device. Method includes selectively transmitting, to an accessory lock controller receiver, a user signal. Method includes receiving the user signal, and determining an accessory lock actuation command based on the received user signal. Method includes causing the accessory lock controller to: lock, or unlock, the accessory lock according to the determined accessory lock actuation command.

In another aspect, the disclosure describes a system for remotely locking and unlocking one or more vehicle accessories of a vehicle. The one or more vehicle accessories have at least one accessory lock. The system includes: at least one accessory lock actuator operably coupled to the at least one accessory lock; at least one accessory lock controller operably coupled to the at least one accessory lock actuator, the at least one accessory lock controller including a receiver; and an accessory lock control transmitter paired with the receiver and configured to selectively transmit, to the receiver, a user signal. The at least one accessory lock controller is configured to: receive, using the receiver, the user signal; determine an accessory lock actuation command based on the received user signal; and cause the at least one accessory lock actuator to: lock, or unlock, the accessory lock according to the determined accessory lock actuation command.

The devices, systems, and methods for remotely locking and unlocking vehicle accessory locks disclosed herein provide users a number of beneficial technical effects and a more desirable user experience as compared to known vehicle accessory locks. Such benefits include, without limitation, greater convenience, being less expensive and less time-consuming to install, being easier to operate and maintain, requiring fewer modifications to vehicles to which they are attached and/or to the vehicle accessories themselves, and making attaching the vehicle accessories to vehicles less likely to violate vehicle warranty conditions.

Further and alternative aspects and features of the disclosed principles will be appreciated from the following detailed description and the accompanying drawings. As will be appreciated, the principles related to devices, systems, and methods for remotely locking and unlocking vehicle accessory locks are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
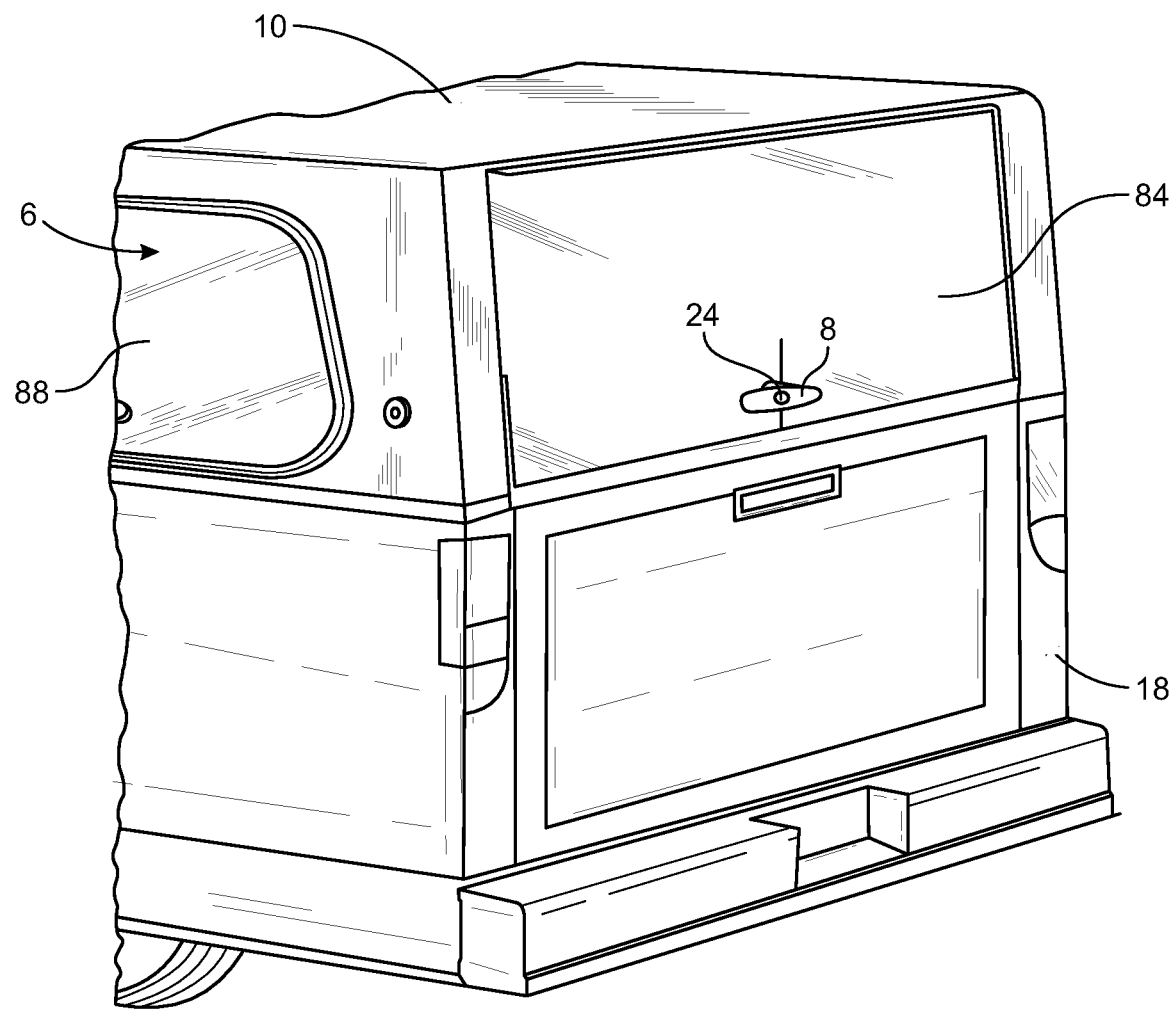
FIG. 1 is a perspective view of a vehicle in the form of a pickup truck having a vehicle accessory in the form of a bed cap with a portal in a closed position and attached to an otherwise exposed bed according to an embodiment of the disclosure.
Figure 2:
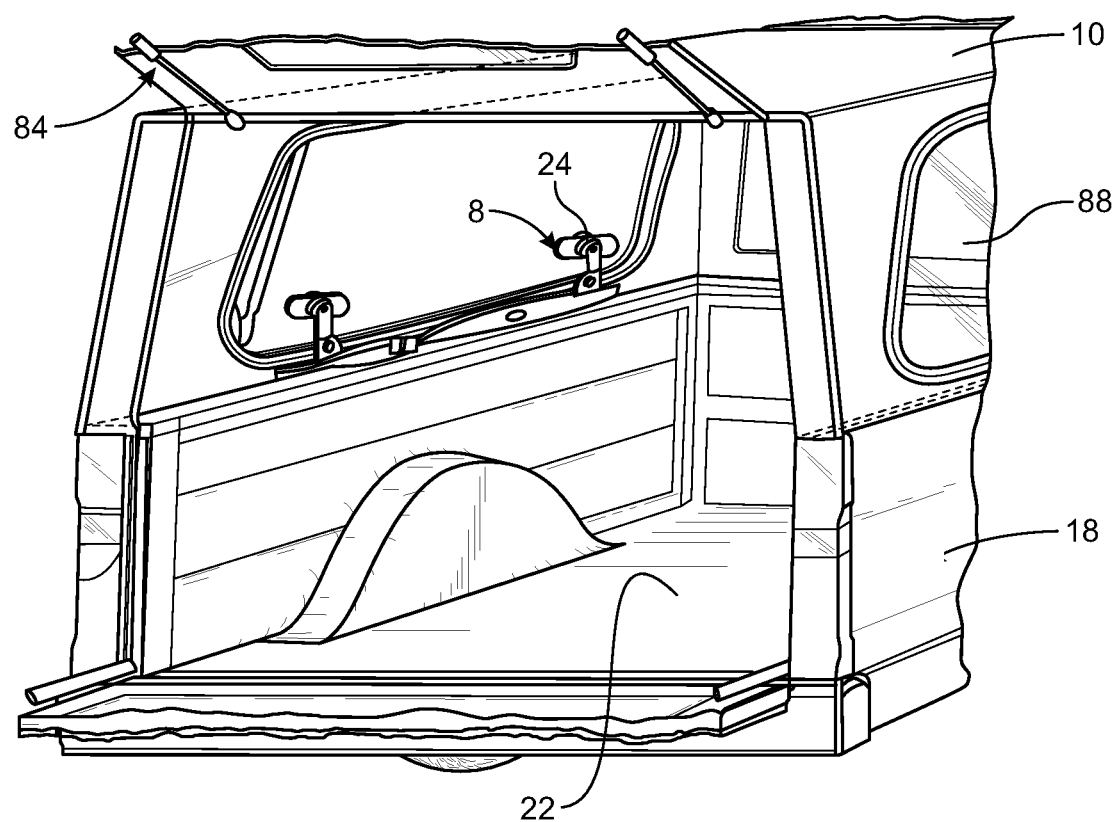
FIG. 2 is a perspective view of the vehicle shown in FIG. 1 with the attached bed cap having the portal in an open position according to an embodiment of the disclosure.

FIGS. 1 and 2 are perspective views of a vehicle (18) in the form of a pickup truck having a vehicle accessory in the form of a bed cap (10) attached to an otherwise exposed bed (22) according to an embodiment of the disclosure. As attached to vehicle (18), bed cap (10) and the portion of vehicle (18) having the otherwise exposed bed (22) together define an enclosure (e.g., an enclosed hollow cavity). Bed cap (10) includes one or more portals (6). As shown in FIG. 1, portals (6) may include at least one door (84) and/or at least one window (88). In FIG. 2, door (84) is shown in an open position, as compared to door (84) shown in a closed position in FIG. 1. Window (88) is shown in a closed position in FIGS. 1 and 2, but it is to be understood that window (88) may also be in an at least partially open position by the action of a user (48) of the vehicle accessory (e.g., bed cap (10)).

In the example shown in FIGS. 1 and 2, portals (6) include handles (8) to facilitate alternately opening and closing portals (6) by the action of the user (48) of the vehicle accessory (e.g., bed cap (10)). Handles (8) include portal locks (24), which, with the portals (6) being in the closed position, facilitate securing the portals (6) in a locked state in the closed position to prevent access to the enclosure and any contents therein.

Figure 3:
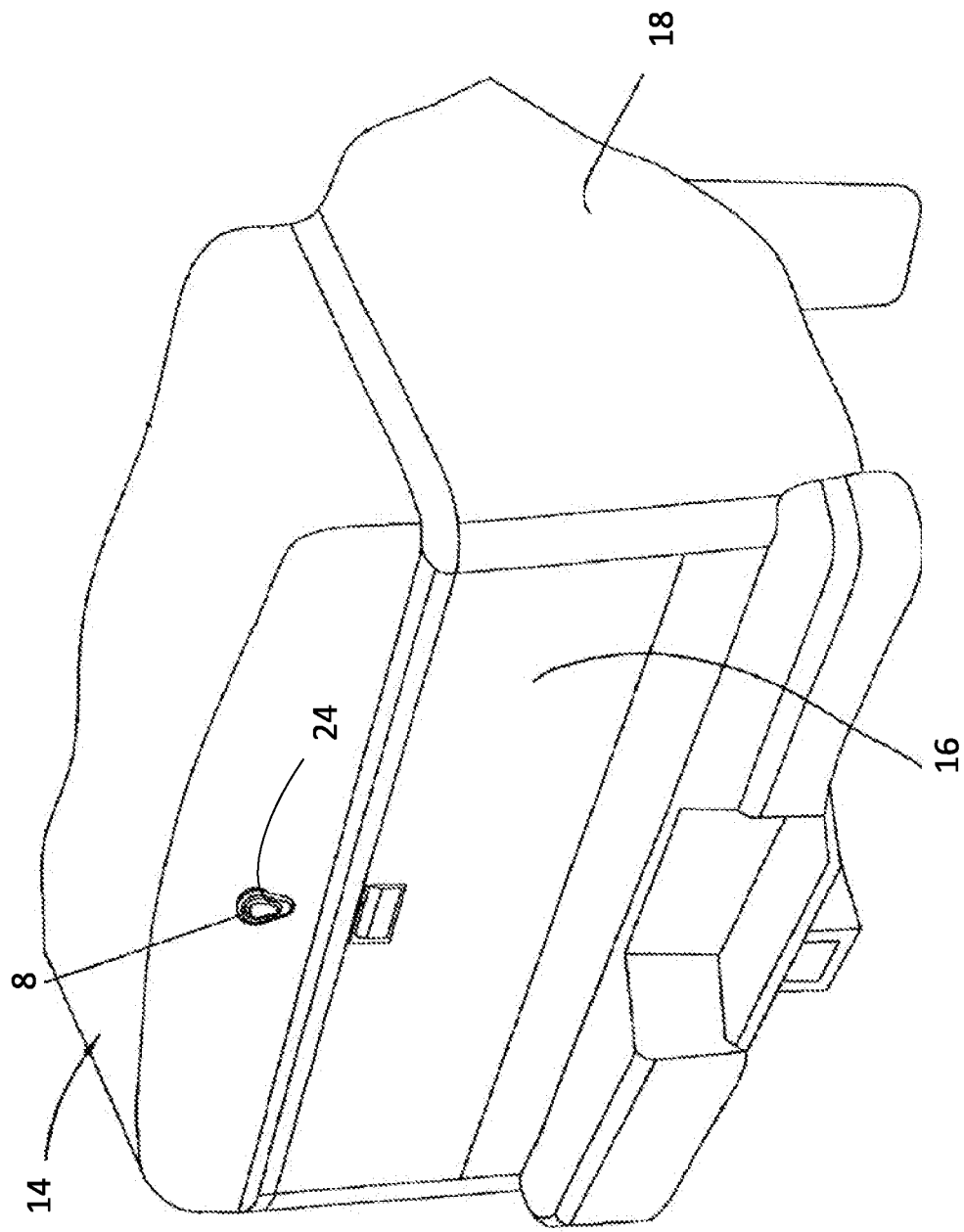
FIG. 3 is a perspective view of another vehicle in the form of a pickup truck having a vehicle accessory in the form of a tonneau cover with a portal in a closed position and attached to the otherwise exposed bed according to an embodiment of the disclosure.
Figure 4:
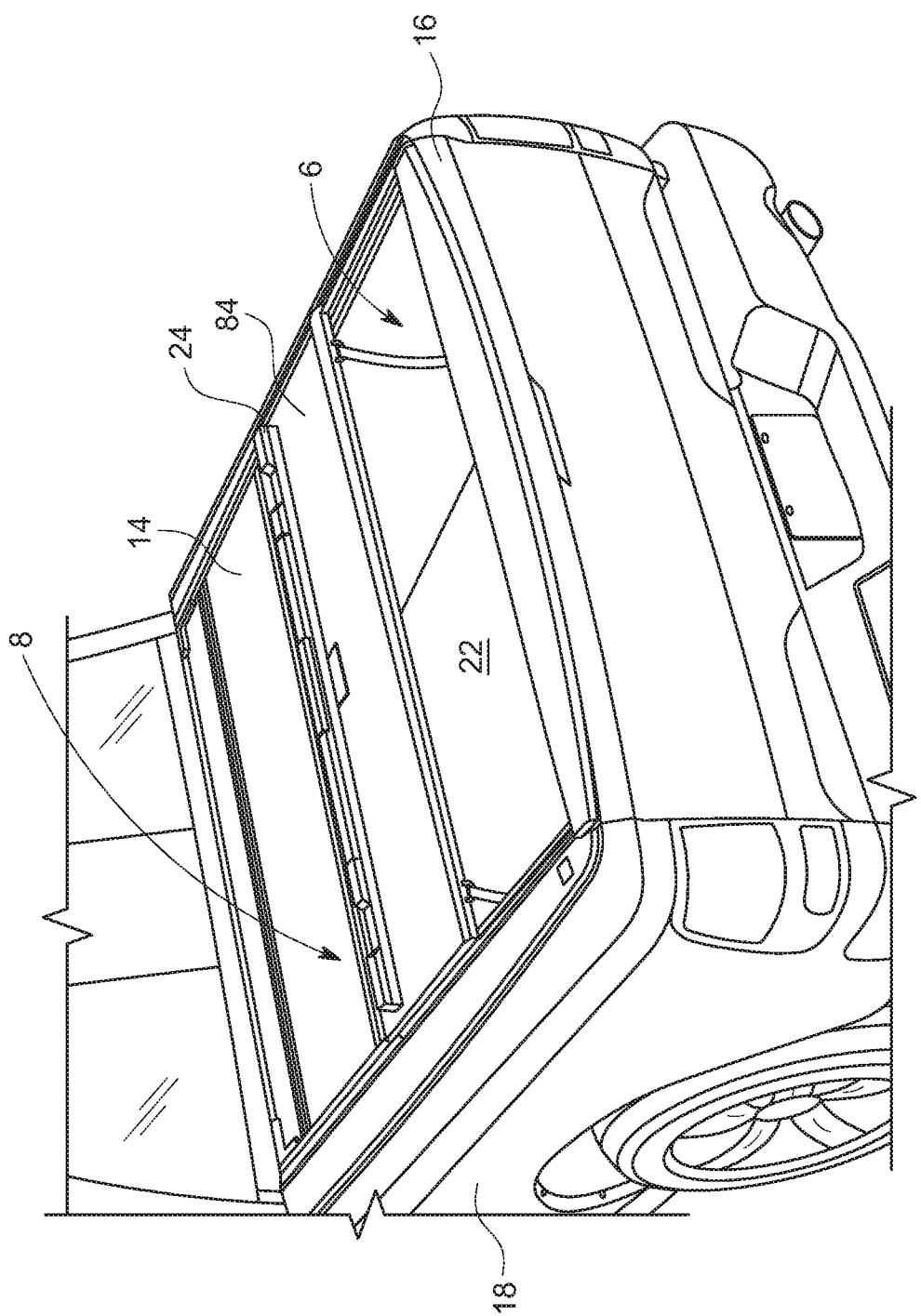
FIG. 4 is a perspective view of the vehicle shown in FIG. 3 with the attached tonneau cover having the portal in an open position according to an embodiment of the disclosure.

FIGS. 3 and 4 are perspective views of a vehicle (18) in the form of a pickup truck having a vehicle accessory in the form of a tonneau cover (14) attached to an otherwise exposed bed (22) according to another embodiment of the disclosure. As attached to vehicle (18), tonneau cover (14) and the portion of vehicle (18) having the otherwise exposed bed (22) together define an enclosure (e.g., an enclosed hollow cavity). Tonneau cover (14) includes a portal (6) and a door (84), which is shown in an open position in FIG. 4, as compared to tonneau cover (14) in a closed position in FIG. 3.

In the example shown in FIGS. 3 and 4, tonneau cover (14) includes at least one handle (8) to facilitate alternately opening and closing door (84) by the action of the user (48) of the vehicle accessory (e.g., tonneau cover (14)). Handle (8) includes a lock (24), which, with the door (84) being in the closed position, facilitates securing the door (84) in a locked state in the closed position. In the illustrated example, with the door (84) of the tonneau cover (14) in the closed and locked position and with a tailgate (16) of the pickup truck vehicle (18) also in a closed and locked position, access to the otherwise exposed bed (22) and any contents in the enclosure is prevented.

Figure 5:
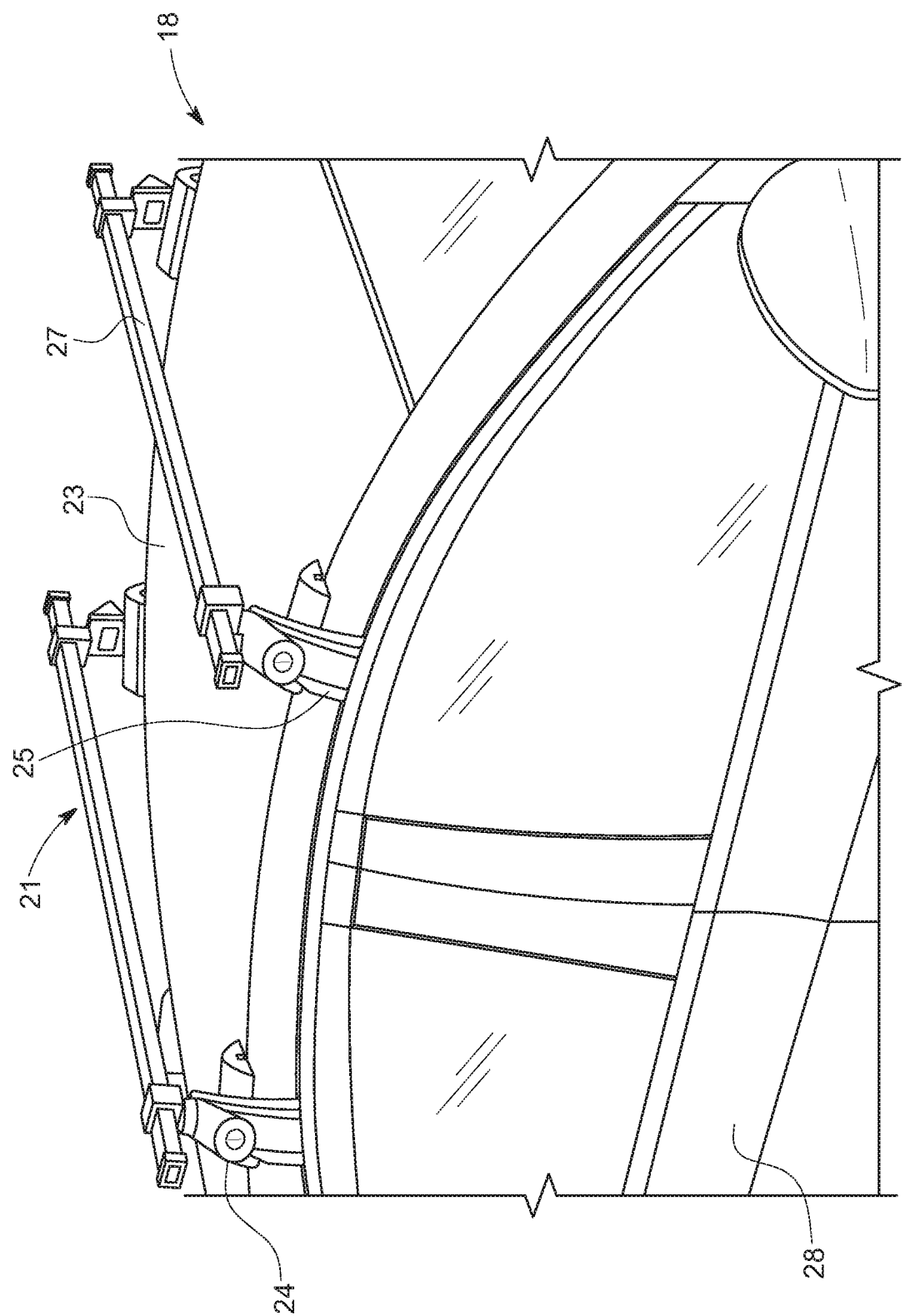
FIG. 5 is a perspective view of a vehicle in the form of a passenger car having a vehicle accessory in the form of a roof rack attached to a roof of the vehicle in a secured and locked position according to an embodiment of the disclosure.

FIG. 5 is a perspective view of a vehicle (18) in the form of a passenger car having a vehicle accessory in the form of a roof rack (21) attached to a roof (23) of the vehicle (18) in accordance with yet another embodiment of the disclosure. In the illustrated example, roof rack (21) attaches to roof (23) by way of clamps (25), which are fitted between a portion of roof (23) and tops of main doors (28) on opposite sides of vehicle (18). Roof rack (21) includes (lock(s) (24). Roof rack (21) is shown in an attached and locked in place position in FIG. 5, as compared to a detached state in which roof rack 21 is not attached to roof (23). In the locked state, removal of roof rack (21) from vehicle (18) is prevented. In the embodiment, lock(s) (24) of roof rack (21) are remotely lockable and unlockable by user (48) using the disclosed system (2) and/or method (200). As used herein, the phrase "remotely lockable" refers to the ability for a lock mechanism to be actuated alternately from locked to unlocked states from a position that is located distal the lock mechanism, the position being separated from the lock mechanism by a finite distance that may be defined by a length of a wired connection or a range of a paired wireless transmitter and receiver (e.g., Bluetooth).

Figure 6:
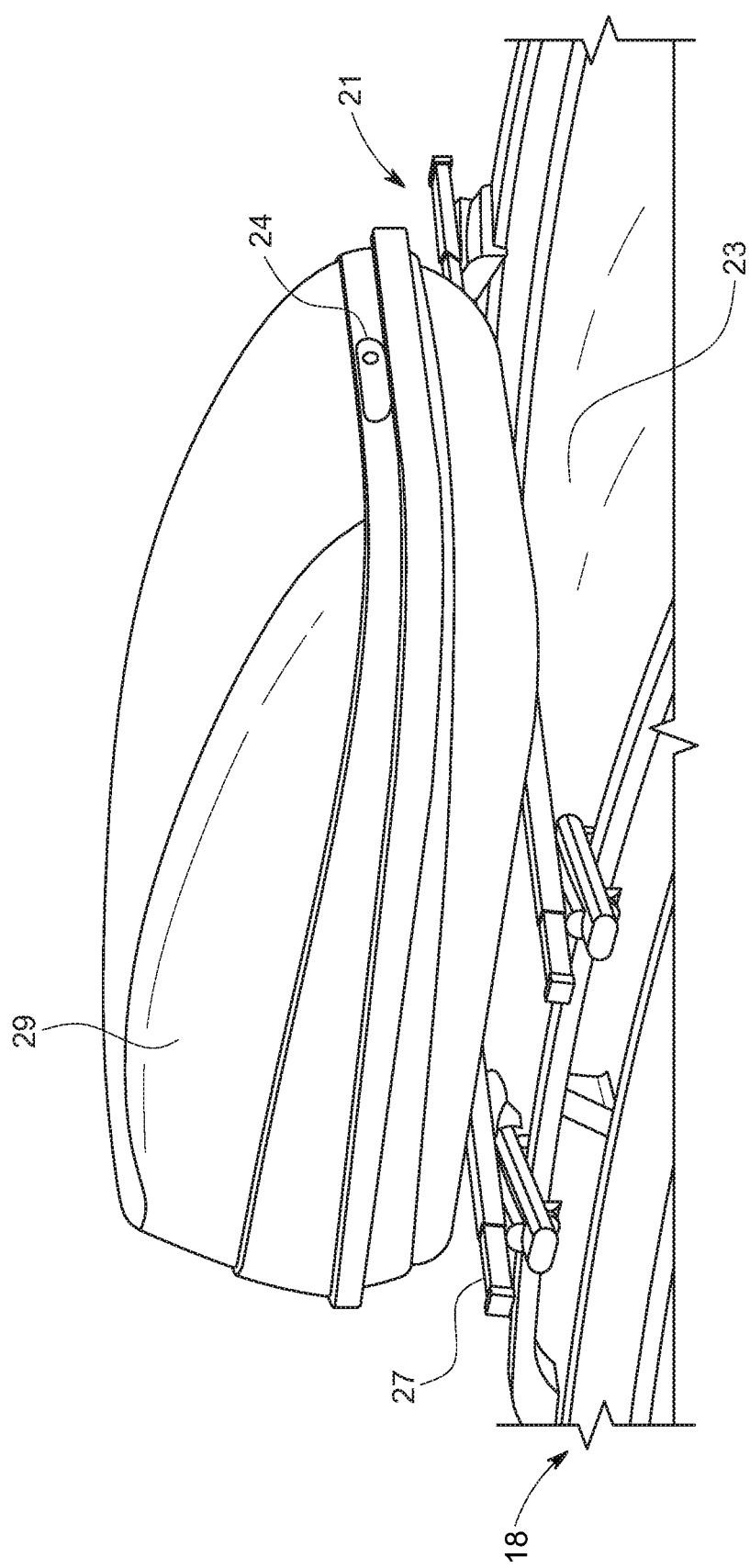
FIG. 6 is a perspective view of the vehicle with attached roof rack shown in FIG. 5 and having an additional accessory in the form of a roof top box attached to the roof rack according to an embodiment of the disclosure.

FIG. 6 is a perspective view of the vehicle (18) with attached roof rack (21) shown in FIG. 5 and having an additional accessory in the form of a roof top box (29) attached to the roof rack (21) according to an embodiment of the disclosure. In other embodiments (not shown in FIG. 6), roof top box (29) is attached directly to vehicle (18) roof (23), instead of being attached to roof (23) via roof rack (21) assembly. In any event, as attached to vehicle (18), roof top box (29) defines an enclosure (e.g., an enclosed hollow cavity). Roof top box (29) includes lock(s) (24), and is alternately opened and closed by user (48) to facilitate placing items into the enclosure. Roof top box (29) is shown attached to vehicle (18) and in a closed and locked state in FIG. 6, as compared to an open and unlocked state in which the enclosure and any of its contents are accessible from the outside. In the closed and locked state, opening of roof top box (29) and access to the enclosure and its contents is prevented. In the embodiment, lock(s) (24) of roof rack (21) are remotely lockable and unlockable by user (48) using the disclosed system (2) and/or method (200).

In other embodiments (not shown in FIGS. 5 and 6), roof rack (21) may have additional and/or other accessories and/or subaccessories which may be lockably attached to roof rack (21). For example, and without limitation, a ski and/or bike mount may be attached to crossbar (27) of roof rack (21) assembly. In such embodiments, subaccessories may include lock(s) (24) of their own, either instead of or in addition to, roof rack (21) lock(s) (24). In a locked state, items mounted to or otherwise held and/or attached to such accessories and/or subaccessories with lock(s) (24) of their own are prevented from being removed from the roof rack (21) and/or its attached accessories and/or subaccessories. In the embodiment, lock(s) (24) of roof rack (21) are remotely lockable and unlockable by user (48) using the disclosed system (2) and/or method (200). In such embodiments, the additional and/or other accessories and/or subaccessories that are lockably attached to roof rack (21) are remotely lockable and unlockable by user (48) using the disclosed system (2) and/or method (200). In yet other embodiments, vehicle (18) may have attached to it a tailgate (16)—or trunk-mounted bike mount accessory having lock(s) (24). In those embodiments, the tailgate (16)—or trunk-mounted bike mount accessory that lockably attaches to vehicle (18) and/or lockably secures bikes and/or parts thereof to the bike mount are remotely lockable and unlockable by user (48) using the disclosed system (2) and/or method (200).

Although the vehicle (18) illustrated in FIGS. 1-4 takes the form of a pickup truck and the vehicle (18) shown in FIGS. 5 and 6 takes the form of a passenger car without exposed bed (22), other types of vehicles may have vehicle accessories including locks of various types with which the systems and methods for remotely locking and unlocking vehicles accessories may be beneficially utilized by users (48) thereof. For example, and without limitation, such other types of vehicle (18) include a jeep, a flatbed truck, a tractor-trailer truck having one or more trailers, a passenger car, a passenger car having the otherwise exposed bed (22), a van, a racing vehicle, a farm machinery vehicle, a camper vehicle, and a custom-built vehicle.

Figure 7:
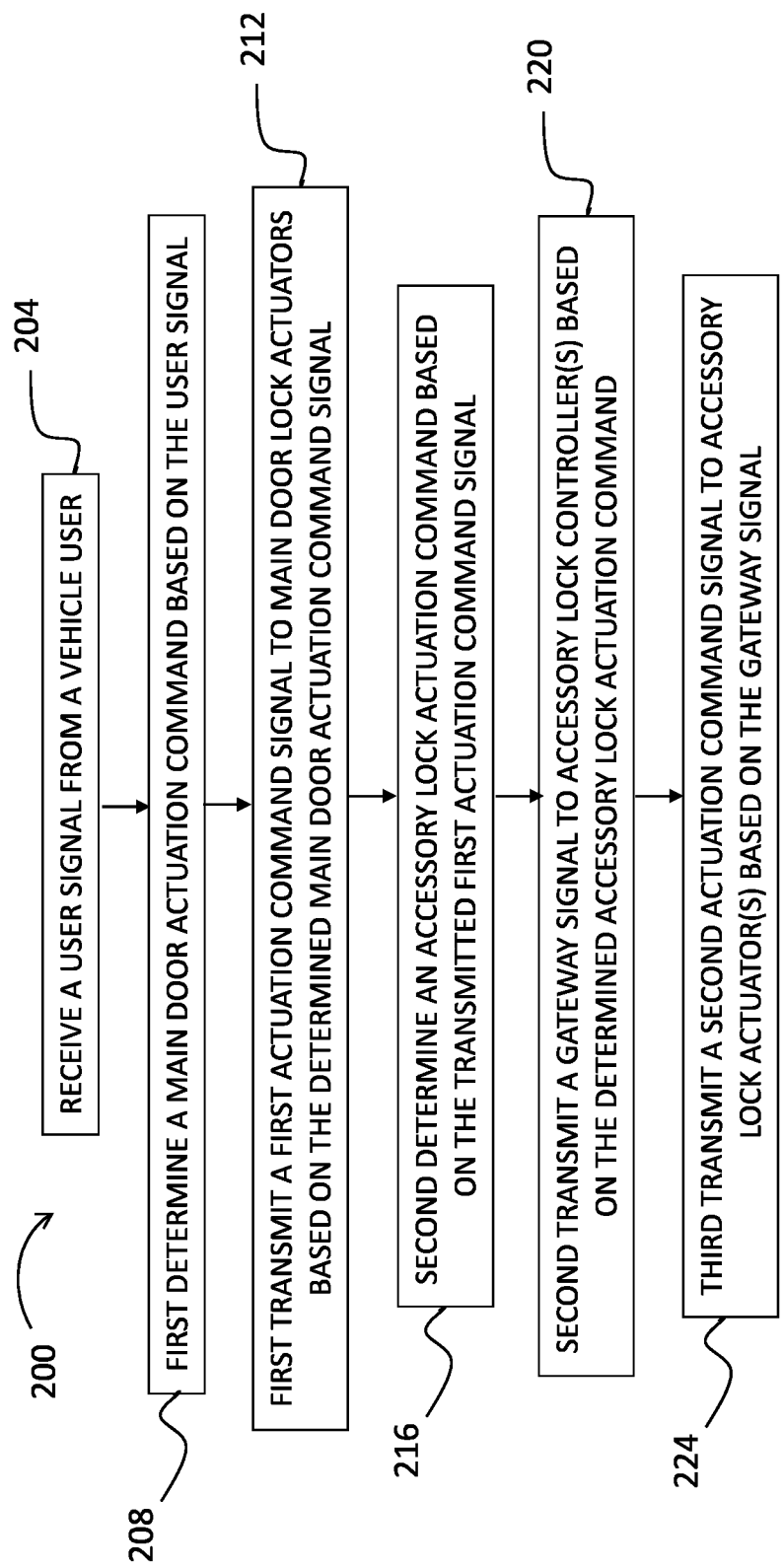
FIG. 7 is a flow chart of a method for remotely locking and unlocking vehicle accessory locks according to an embodiment of the disclosure.
Figure 8:
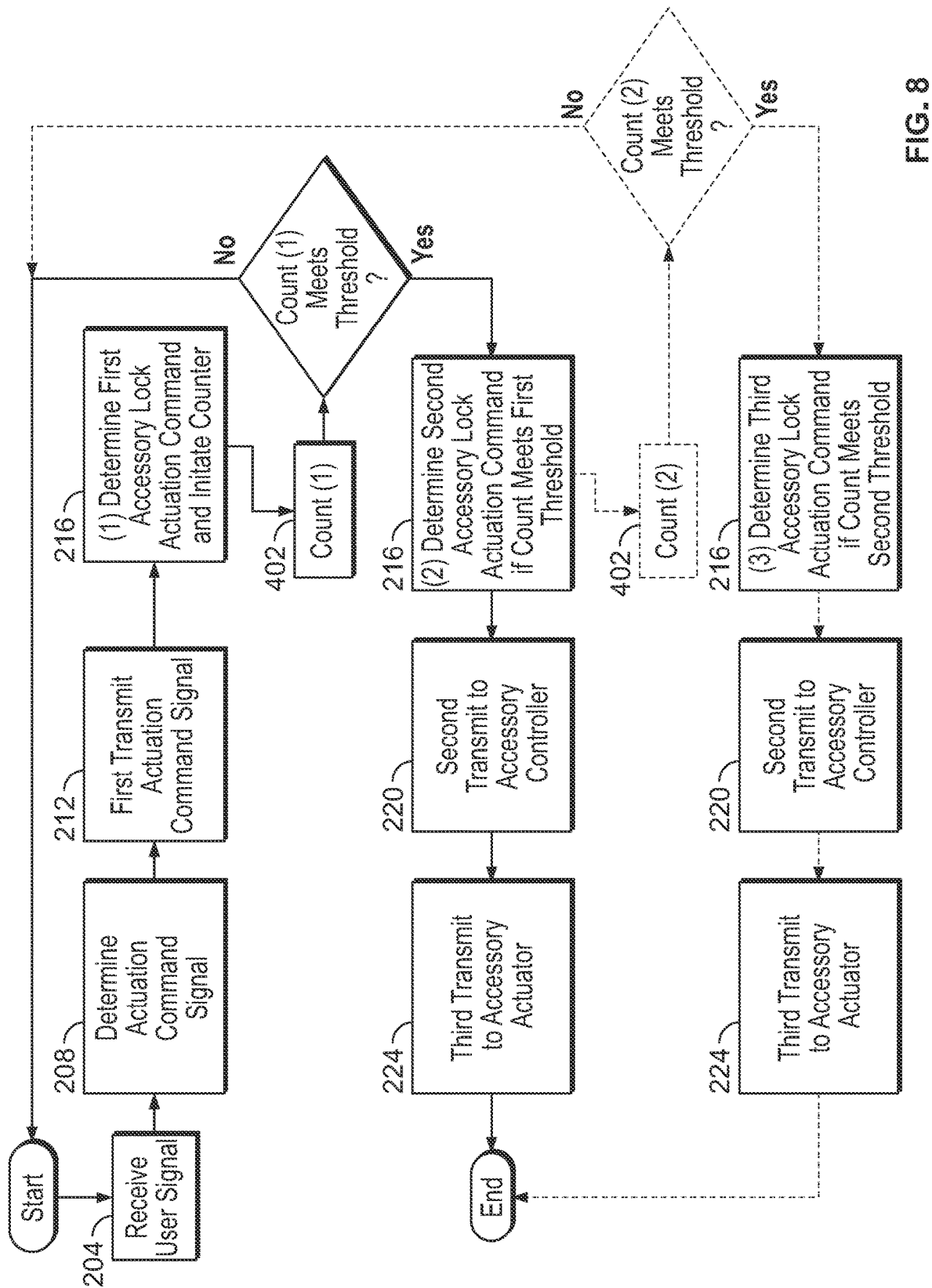
FIG. 8 is a state diagram representation of aspects of the method shown in FIG. 7 according to an embodiment of the disclosure.
Figure 9A:
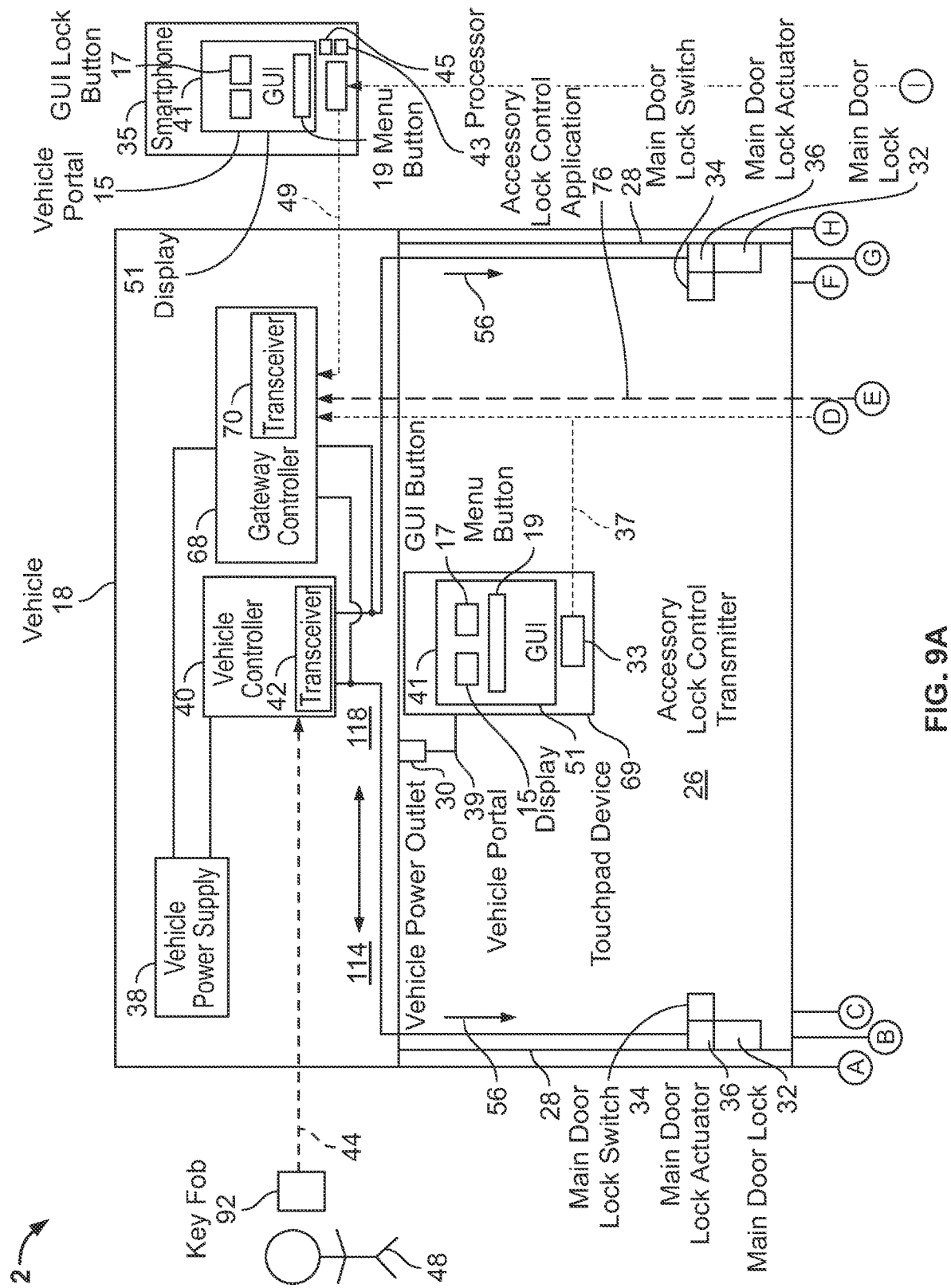
FIGS. 9A and 9B are schematic diagrams of a system for remotely locking and unlocking vehicle accessory locks according to an embodiment of the disclosure
Figure 9B:
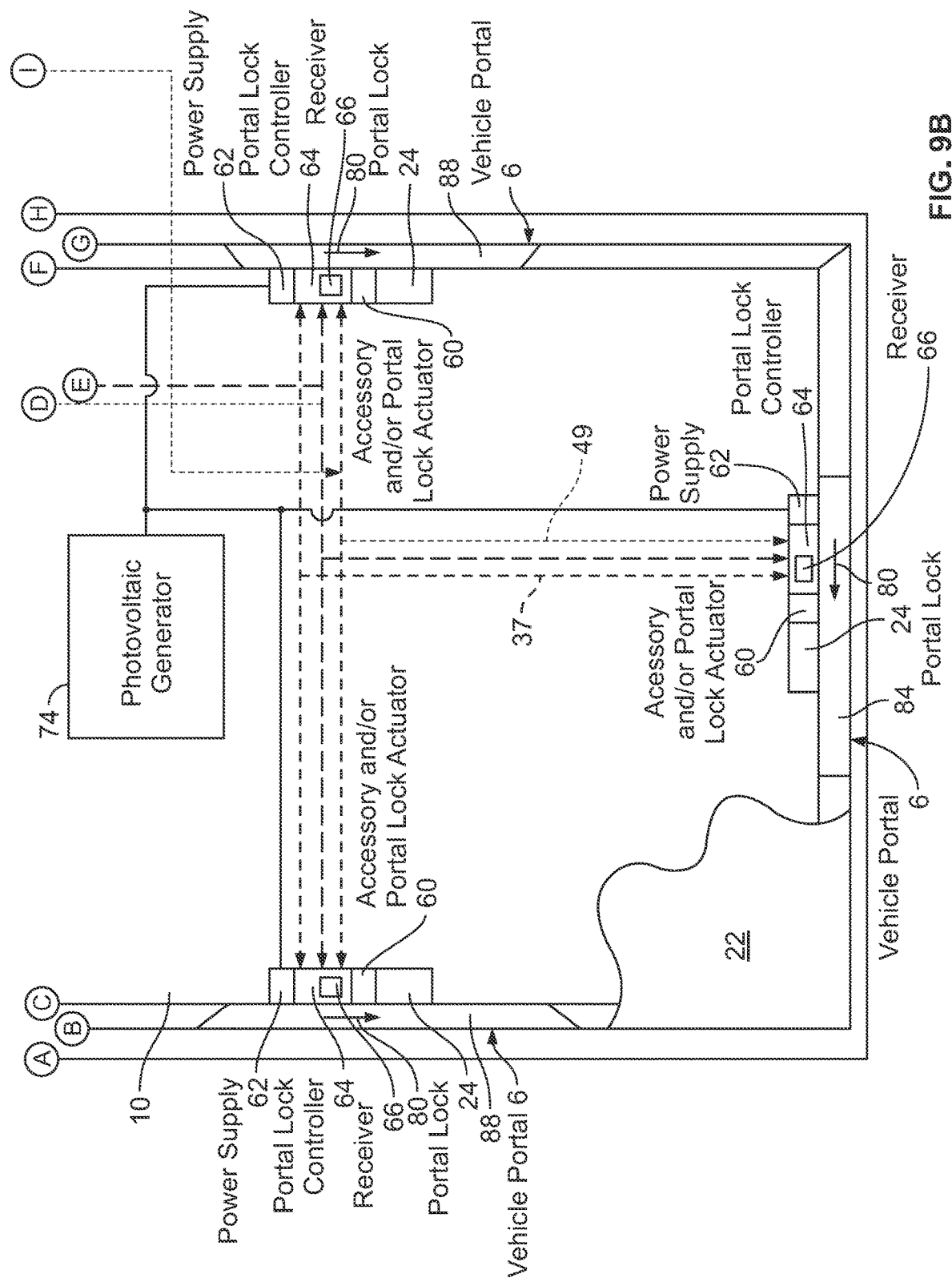

FIG. 7 is a flow chart of a method (200) for remotely locking and unlocking vehicle (18) accessory locks (24) according to an embodiment of the disclosure. FIG. 8 is a state diagram representation of aspects of the method (200) shown in FIG. 7 according to an embodiment of the disclosure. FIGS. 9A and 9B are schematic diagrams of a system (2) for remotely locking and unlocking vehicle (18) accessory locks (24) according to an embodiment of the disclosure. In the examples illustrated in FIGS. 7 and 8, method (200) is implemented, at least in part, using system (2).

Referring to FIGS. 7, 8, 9A, and 9B, method (200) includes receiving (204), at a vehicle controller (40) positioned in or on the vehicle (18), a user signal (44) from a vehicle user (48) positioned inside or outside the vehicle (18). Method (200) also includes first determining (208), by the vehicle controller (40) and based on the user signal (44), a main door actuation command. Method (200) further includes first transmitting (212), by the vehicle controller (40) and based on the determined main door actuation command, a first actuation command signal (56) to one or more main door lock actuators (36). Method (200) also includes second determining (216), by a gateway controller (68) operably coupled to the vehicle controller (40), an accessory lock actuation command based on the transmitted first actuation command signal (56). In embodiments where the vehicle accessory includes one or more portals (6), the accessory lock actuation command is or includes a portal lock actuation command.

As used herein, the phrase "operably (or operatively) coupled (or connected)," refers to two or more functionally-related components being coupled to one another for purposes of translation and/or transfer of a mechanical force, a flow of electric current, and/or a flow of data signals. In the case of data communication, this coupling of the two or more components may be a wired connection and/or a wireless connection.

As used herein, the word "controller" refers to an computing device, an application-specific integrated circuit, and combinations thereof, capable of implementing operations based in logical operations, arithmetic operations, measurement operations, sensing operations, and combinations thereof, for purposes of performing one or more actions as output(s) (e.g., causing the transmission of a control signal distal gateway controller (68)) in response to one or more input(s) (e.g., an electric current begins to flow in a conductor connected to vehicle controller (40)).

Method (200) further includes second transmitting (220), by the gateway controller (68) and based on the determined accessory lock actuation command, a gateway signal (76) to at least one accessory lock controller (64) positioned on, in, or proximal, the vehicle accessory (e.g., bed cap (10), tonneau cover (14), roof rack (31), roof rack subaccessory, and the like) and operably coupled to at least one accessory lock actuator (60). In embodiments where the vehicle accessory includes one or more portals (6), the gateway signal (76) is transmitted (220) by the gateway controller (68) to at least one portal lock controller (64) based on the determined portal lock actuation command. Method (200) also includes third transmitting (224), by the at least one accessory lock controller (64) and based on the gateway signal (76), a second actuation command signal (80) to the at least one accessory lock actuator (60) operably coupled to the at least one accessory lock (24). In embodiments where the vehicle accessory includes one or more portals (6), the second actuation command is transmitted (224), based on the gateway signal (76), by the at least one portal lock controller (64) operably coupled to the at least one portal lock (24).

Referring now to FIGS. 9A and 9B, the one or more main doors one or more main doors (28) of vehicle (18) have remotely lockable and unlockable main door locks (32). Vehicle controller (40) is positioned in or on the vehicle (18) (e.g., in an engine compartment (20) of vehicle (18)). Vehicle controller (40) includes a transceiver (42). In an example, vehicle controller (40) includes a receiver either in place of, or in addition to, transceiver (42). In such embodiments, the functionality of transceiver (42) in the ensuing description is equally applicable to receiver of vehicle controller (40). Vehicle controller (40) may also include a programmable logic controller (PLC) (not shown in FIGS. 9A and 9B). Vehicle controller (40) may also include an H-bridge circuit (not shown in FIGS. 9A and 9B).

Vehicle (18) also includes a power supply (38). For example, and without limitation, power supply (38) is or includes a battery positioned in engine compartment (20). In the illustrated example, vehicle controller (40) is coupled to power supply (38), which supplies electric power to vehicle controller (40) and main door lock actuators (36). Main door lock switches (34) allow user (48) to alternately lock and unlock main door locks (32) by manually manipulating the switches (34), such as when user (48) is located inside a cabin (26) of vehicle (18). As shown in FIGS. 9A and 9B, in a preferred embodiment, gateway controller (68) receives electric power from power supply (38) (e.g., battery) for operation in accordance with the disclosed system (2) and method (200). In an example, gateway controller (68) includes a DC-DC power converter and/or power conditioning circuitry to yield an operating voltage (e.g., ~12 V DC to ~5 V DC) suitable for performing the disclosed functions using the disclosed components in operation according to the disclosed system (2) and method (200). In another example (not shown in FIGS. 9A and 9B), gateway controller (68) includes overcurrent and/or other circuit protective devices. In other embodiments (not shown in FIGS. 9A and 9B), gateway controller (68) includes a dedicated power supply (e.g., one or more batteries) instead of or in addition to (e.g., as a backup power supply) power supply (38).

According to an embodiment of the disclosure, the vehicle controller (40) receives (204) (e.g., using transceiver (42)) user signal (44) from the vehicle user (48) positioned inside or outside the vehicle (18). Vehicle controller (40) first determines (208), based on the user signal (44), main door actuation command. Vehicle controller (40) first transmits (212) (e.g., using transceiver (42)), based on the determined main door actuation command, first actuation command signal (56) to the one or more main door lock actuators (36).

In the example embodiment, accessory and/or portal lock controller(s) (60) are operably coupled to accessory and/or portal lock(s) (24). Gateway controller (68) is operably coupled to vehicle controller (40). Gateway controller (68) includes a transceiver (70). In an example, gateway controller (68) includes a transmitter either in place of, or in addition to, transceiver (70). In such embodiments, the functionality of transceiver (70) in the ensuing description is equally applicable to transmitter of gateway controller (68). Gateway controller (68) second determines (216) accessory lock and/or portal lock actuation command(s) based on the transmitted first actuation command signal (56). Gateway controller (68) second transmits (220) (e.g., using transceiver (70)), based on the determined accessory lock and/or portal actuation command(s), gateway signal (76) to the accessory and/or portal lock controller(s) (64). Accessory and/or portal lock controllers (64) include transceiver(s) (66). In an example, accessory and/or portal lock controllers (64) include receiver(s) either in place of, or in addition to, transceiver(s) (66). In such embodiments, the functionality of transceiver(s) (66) in the ensuing description is equally applicable to receiver(s) of accessory and/or portal lock controllers (64). Accessory and/or portal lock controller(s) receive (e.g., using transceiver(s) (66)) gateway signal (76). In the example, accessory and/or portal lock controller(s) (64) third transmit (224) (e.g., using transceiver(s) (66)), based on gateway signal (76), second actuation command signal (80) to accessory and/or portal lock actuator(s) (60).

In the embodiment shown in FIGS. 9A and 9B, accessory and/or portal lock controller(s) (64) and accessory and/or portal lock actuators (60) include a power supply (62). In one example, power supply (62) includes one or more batteries. Power supply (62) batteries may be rechargeable batteries. In an embodiment (not shown in FIGS. 9A and 9B), accessory and/or portal lock controller(s) (64) include a battery life indicator(s) to provide user (48) a warning as to when the power supply (62) battery or batteries are at or nearing the end of their useful service life. In an example, battery life indicator(s) include lamps (e.g., LED(s)) that are visual to user (48) from outside vehicle (18) and/or from within cabin (26). In such examples, lamps may be steadily illuminated or flash on and off when battery or batteries are nearing or nearing end of life status. In another example, battery life indicator(s) include speaker(s) that generate sound(s) that are audible user (48) from outside vehicle (18) and/or from within cabin (26). In such examples, speakers may steadily emit sound(s) or they may intermittently emit sound(s) (e.g., beep) when battery or batteries are nearing or nearing end of life status.

In the illustrated example, one or more photovoltaic (PV) generators (74) are positioned on an exterior surface of accessory (e.g., bed cap (10)) and/or vehicle (18) that is illuminated, at least in part, by natural (e.g., solar) and/or artificial light. Electric power is provided by PV generator(s) (74) to power supply (62) to charge the rechargeable batteries therein. In other examples, energy harvesting devices (not shown) such as wind turbines and/or vibrational energy harvesters may be positioned on, in, or proximal the vehicle accessory (e.g., bed cap (10)) and/or vehicle (18) for providing electrical power to charge batteries of power supply (62). In yet other examples, accessory and/or portal lock controller(s) (64) and accessory and/or portal lock actuators (60) are provided with electric power from power supply

(38) of vehicle (18), either instead of or in addition to from batteries of power supply (62).

In an embodiment, user signal (44) is a user radio signal (44), and the receiving (204) of method (200) includes receiving (204), at the vehicle controller (40), the user radio signal (44) from the user (48). In the embodiment, vehicle controller (40) uses transceiver (42) to receive (204) user radio signal (44) from user (48). In an embodiment, the receiving (204) of method (200) includes receiving (204), at the vehicle controller (40), user radio signal (44) from a key fob (92) held by user (48). In the embodiment, vehicle controller (40) uses transceiver (42) to receive (204) user radio signal (44) from key fob (92).

In an embodiment, method (200) also includes first decoding, by the vehicle controller (40), user signal (44). In the embodiment, vehicle controller (40) first decodes user signal (44). In an embodiment, the first determining (208) step of method (200) includes first determining (208), by the vehicle controller (40) and based on the decoded user signal (44), main door actuation command. In the embodiment, vehicle controller (40) first determines (208), based on the decoded user signal (44), main door actuation command. In an embodiment, the first determining (208) step of method (200) includes first determining (208), by the vehicle controller (40) and based on user signal (44), one of: a main door lock command, and a main door unlock command. In the embodiment, vehicle controller (40) first determines (208), based on user signal (44), one of: a main door lock command, and a main door unlock command.

In an embodiment, gateway signal (76) is a gateway radio signal (76), and the second transmitting (220) step of method (200) includes second transmitting (220) (e.g., using transceiver (70)), by the gateway controller (68) and based on the determined accessory and/or portal lock actuation command(s), gateway radio signal (76) to accessory and/or portal lock controller(s) (64). In the embodiment, gateway controller (68) uses transceiver (70) to second transmit (220), based on the determined accessory and/or portal actuation command(s), gateway radio signal (76) to accessory and/or portal lock controller(s) (64).

In an embodiment, gateway radio signal (76) is a Bluetooth signal (76), and the second transmitting (220) step of method (200) includes second transmitting (220) (e.g., using transceiver (70)), by the gateway controller (68) and based on the determined accessory and/or portal actuation command(s), the Bluetooth signal (76) to accessory and/or portal lock controller(s) (64). In the embodiment, gateway controller (68) uses transceiver (70) to second transmit (220), based on the determined portal actuation command, Bluetooth signal (76) to accessory and/or portal lock controller(s) (64). In an embodiment, method (200) further includes encoding, by the gateway controller (68) and prior to the second transmitting (220) step, the gateway radio signal (76) using a Bluetooth protocol. In the embodiment, gateway controller (68) encodes gateway radio signal (76) using Bluetooth protocol prior to second transmitting (220) gateway radio signal (76) using transceiver (70).

In an embodiment, method (200) also includes second decoding, by the accessory and/or portal lock controller(s) (64), the gateway signal (76). In the embodiment, accessory and/or portal lock controller(s) (64) second decodes the gateway signal (76). In an embodiment, the third transmitting (224) step of method (200) includes third transmitting (224) (e.g., using transceiver (66)), by accessory and/or portal lock controller(s) (64) and based on the decoded gateway signal (76), the second actuation command signal (80). In the embodiment, accessory and/or portal lock controller(s) (64) uses transceiver (66) to third transmit (224) second actuation command signal (80) based on decoded gateway signal (76).

In an embodiment, the second determining (216) step includes second determining (216), by the gateway controller (68) and based on the transmitted first actuation command signal (56), one of: an accessory and/or portal lock command, and an accessory and/or portal unlock command. In the embodiment, the gateway controller (68) second determines (216), based on transmitted first actuation command signal (56), one of: the accessory and/or portal lock command, and the accessory and/or portal unlock command.

In an embodiment, method (200) further includes actuating, by the at least one accessory and/or portal lock actuator(s) (60) and based on the second actuation command signal (80), the accessory and/or portal lock(s) (24). In the embodiment, accessory and/or portal lock actuator(s) (60) actuate accessory and/or portal lock(s) (24) based on the second actuation command signal (80).

In an embodiment, method (200) also includes locking, by the main door lock actuator(s) (36) and based on the first actuation command signal (56), the main door locks (32). In the embodiment, main door lock actuator(s) (36) lock main door locks (32) based on first actuation command signal (56). In an embodiment, method (200) further includes unlocking, by the main door lock actuator(s) (36) and based on the first actuation command signal (56), the main door locks (32). In the embodiment, main door lock actuator(s) (36) unlock main door locks (32) based on first actuation command signal (56). In an embodiment, the actuating step of method (200) is performed concurrently with the locking and unlocking steps of method (200). In the embodiment, accessory and/or portal lock actuator(s) (60) actuate accessory and/or portal lock(s) (24) concurrently with main door lock actuator(s) (36) locking or unlocking main door lock(s) (32).

In an embodiment, the actuating of method (200) step includes: locking, by the accessory and/or portal lock actuator(s) (60), the accessory and/or portal lock(s) (24) in response to the determined accessory and/or portal actuation command being the accessory and/or portal lock command. In the embodiment, accessory and/or portal lock actuator (60) locks accessory and/or portal lock(s) (24) in response to accessory and/or portal actuation command determined by gateway controller (68) being accessory and/or portal lock command. In an embodiment, the actuating step of method (200) includes unlocking, by the accessory and/or portal lock actuator(s) (60), the accessory and/or portal lock(s) (24) in response to the determined accessory and/or portal actuation command being the accessory and/or portal unlock command. In the embodiment, accessory and/or portal lock actuator (60) unlocks accessory and/or portal lock(s) (24) in response to accessory and/or portal actuation command determined by gateway controller (68) being accessory and/or portal unlock command.

In an embodiment, method (200) further includes encoding, by the gateway controller (68), the gateway signal (76) to contain information that is functionally equivalent to information encoded by the first actuation command signal (56). In the embodiment, gateway controller (68) encode(s) gateway signal (76) to contain information that is functionally equivalent to information encoded by first actuation command signal (56).

In an embodiment, the first determining (208) step of method (200) includes first determining (208), by the vehicle controller (40) and based on the user signal (44), one of: a main door lock command effecting a flow of current in main door lock actuator(s) (36) in a first direction (114); and a main door unlock command effecting a flow of current in the main door lock actuator(s) (36) in a second direction (118), where the second direction is opposite the first direction (114). In the embodiment, vehicle controller (40) first determines (208), based on user signal (44), one of: the main door lock command effecting the flow of current in main door lock actuators (36) in the first direction (114); and the main door unlock command effecting the flow of current in main door lock actuator(s) (36) in the second direction (118).

In an embodiment, the second determining (216) step of method (200) includes detecting, by the gateway controller (68), a direction (114, 118) of the flow of current in and/or a polarity of the applied voltage of the main door lock actuator(s) (36). In the embodiment, gateway controller (68) detects the direction (114, 118) of the flow of current in and/or a polarity of the applied voltage of the main door lock actuator(s) (36).

In an embodiment, method (200) also includes positioning the accessory and/or portal lock controller(s) (64) on, in, or proximal the vehicle accessory of the vehicle (18). In an embodiment, the accessory and/or portal lock controller(s) (64) is/are positioned proximal accessory and/or portal lock(s) (24).

In one embodiment, the accessory and/or portal lock actuator(s) (60) is or includes a solenoid actuator. In another embodiment, the accessory and/or portal lock actuator(s) (60) is or includes an electric motor. In yet another embodiment, the accessory and/or portal lock actuator(s) (60) is or includes a motorized linear actuator. In still another embodiment, the accessory and/or portal lock actuator(s) (60) is or includes a direct current (DC) motor. In another embodiment still, the accessory and/or portal lock actuator(s) (60) is or includes a geared electric motor rotatably coupled to a geared lock (24) mechanism.

Referring to FIG. 8, in an embodiment, method (200) includes a counting (402) step. For vehicle controllers (40) having the capacity to determine (e.g., in step 208) actuation commands separately for each of the main doors (28) and/or for main doors (28) and a vehicle (18) tailgate (16) or trunk (e.g., by receiving multiple user signals (44)), gateway controller (68) counts (402) a corresponding number of first actuation command signals (56) transmitted by vehicle controller (40). In this embodiment, gateway controller (68) does not transmit gateway signal (76) to accessory and/or portal lock actuator(s) (60) unless and until a threshold count value is met. In an example, a single key fob (92) press by user (48) does not result in either locking or unlocking of accessory lock(s) (24). In this example, a first performance of the counting (402) step includes determining, by gateway controller (68) that a first actuation command signal (56) has been transmitted by vehicle controller (40) (e.g., to a driver side main door lock actuator (36)). In the example, the first performance of the counting (402) step also includes starting either a digital or analog electronic timer upon determining that first actuation command signal (56) was transmitted. If an elapsed time during this first performance of the counting (402) step is less than (or, in some embodiments, less than or equal to) a first predetermined amount of time (e.g., specified by user (48) or by a system (2) manufacturer), then method (200) proceeds to a second performance of the second determining (216) step. If another user signal (44) is received by vehicle controller (40) and another first actuation command signal (56) is transmitted to, for instance, passenger side main door lock actuator (36) within the first predetermined amount of time, then gateway controller (68) transmits gateway signal (76). If this elapsed time condition is not met during the first performance of the counting (402) step, then method (200) proceeds to an end state, as shown in FIG. 8.

In another example (denoted by dashed lines in FIG. 8), if the elapsed time condition is met during the first performance of the counting (402) step, gateway controller (68) does not transmit gateway signal (76), but instead performs a second occurrence of the counting (402) step. If an elapsed time during this second performance of the counting (402) step is less than (or, in some embodiments, less than or equal to) a second predetermined amount of time (e.g., specified by user (48) or by a system (2) manufacturer), then method (200) proceeds to a third performance of the second determining (216) step. In this example, the first and second predetermined amount of time are equal. In other examples, they are not equal. If yet another user signal (44) is received by vehicle controller (40) and yet another first actuation command signal (56) is transmitted to, for instance, a trunk lock actuator within the second predetermined amount of time, then gateway controller (68) transmits gateway signal (76). If this elapsed time condition is not met during the second performance of the counting (402) step, then method (200) proceeds to an end state. In other embodiments (not shown in FIG. 8), greater than two occurrences of the counting (402) step may be performed in method (200) in like manner as described above and with reference to FIG. 8. In any of these embodiments, including one or more performances of the counting (402) step mitigates a risk of accidentally unlocking accessory and/or portal lock(s) (24) at undesired times (e.g., while vehicle (18) is moving).

Figure 10:
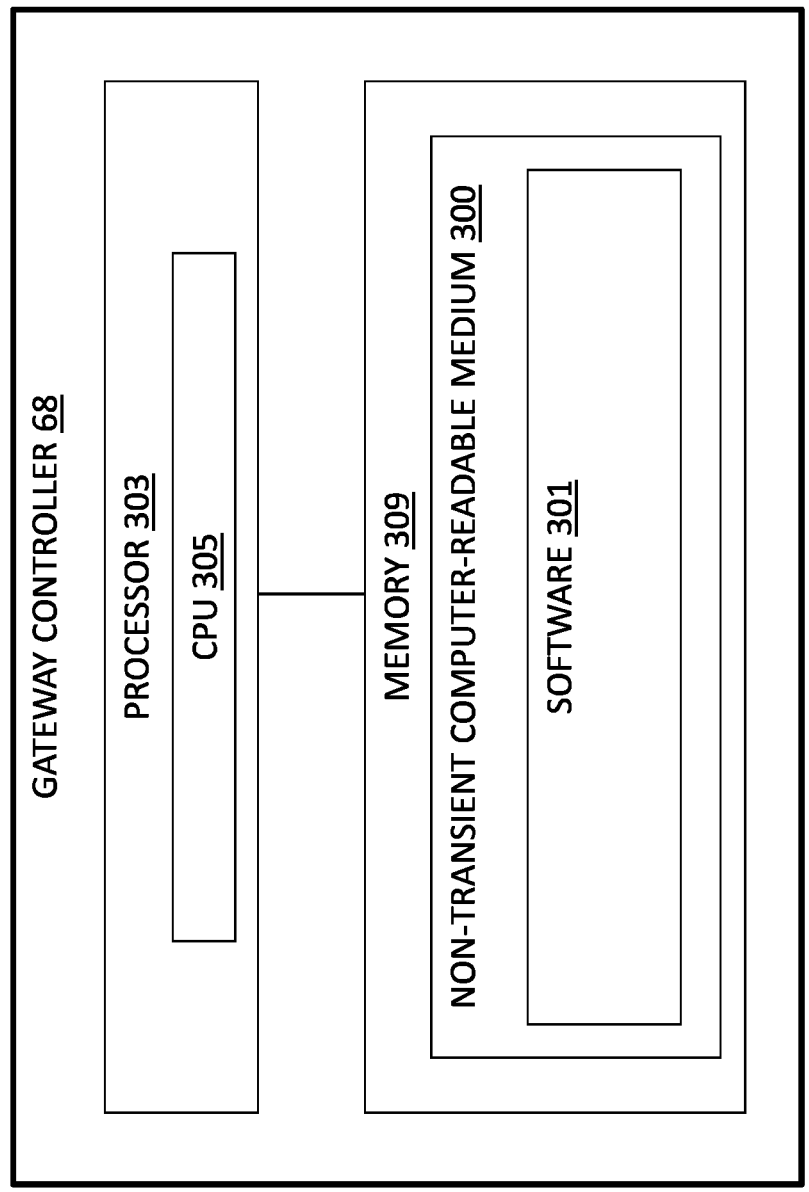
FIG. 10 is a block diagram of a gateway controller of the system shown in FIG. 7 according to an embodiment of the disclosure.

Referring to FIG. 10, in some embodiments, gateway controller (68) includes one or more processors (303), wherein each of the processor(s) (303) include at least one CPU (305). In such embodiments, gateway controller (68) includes one or more memory devices (309) operably coupled to processor(s) (303). In some such embodiments, memory device(s) (309) include non-transient computer-readable media (300) which store process-executable instructions (e.g., software (301)) for remotely locking and unlocking vehicle accessory locks. When executed by the one or more processor(s) (303), the processor-executable instructions cause the one or more processor(s) (303) to perform one or more of the above-described steps of method (200) implemented, at least in part, using system (2).

Figure 11:
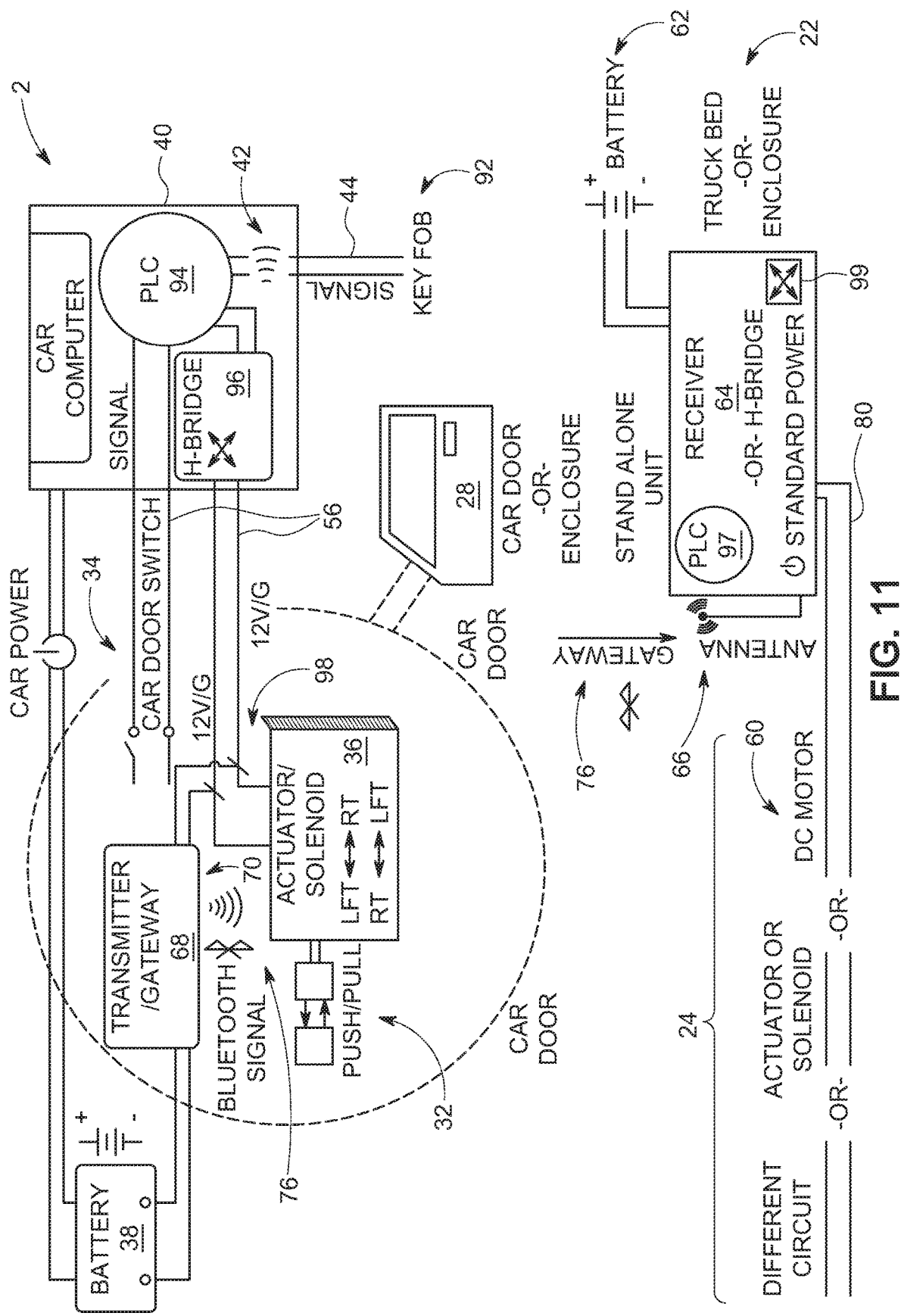
FIG. 11 is a schematic diagram of the system shown in FIGS. 9A and 9B according to an embodiment of the disclosure.

FIG. 11 is a schematic diagram of the system (2) shown in FIGS. 9A and 9B according to an embodiment of the disclosure. In the embodiment, vehicle controller (40) includes a PLC (94) and an H-bridge circuit (96). PLC (94) implements a main door lock control scheme for main door locks (32). Transceiver (42) of vehicle controller (40) receives (204) user signal (44) from key fob (92), and user signal (44) is relayed to PLC (94). PLC (94) first determines (208) main door actuation command based on the received user signal (44). For instance, if a current state of main door locks (32) is locked and user signal (44) indicates that user (48) wishes to unlock main door locks (32), PLC (94) initiates a flow of electric current via H-bridge circuit (96) in the first direction (114) to and at a first voltage polarity across terminals of main door lock actuators (36), thereby causing actuators (36) to actuate mechanisms of main door locks (32) from an unlocked position to a locked position.

In the embodiment, accessory and/or portal lock(s) (24) are also in a locked state at such times when main door locks (32) are in the locked state. Gateway controller (68) is operably coupled to electrical lines connecting H-bridge (96) to main door actuators (36) and which are used for first transmitting (212) first actuation command signal (56). In the example shown in FIG. 11, gateway controller (68) is operably coupled to the H-bridge (96) and/or to main door actuators (36) lines by way of at least one connector (98) (e.g., clips). In another embodiment (not shown), gateway controller (68) is operably coupled to the H-bridge (96) to main door actuators (36) lines by way of at least one contactless sensor (e.g., at least one current clamp which senses at least one of the current flow direction in and the voltage polarity of the H-bridge (96) to main door actuators (36) lines).

In the embodiment, gateway controller (68) second determines (216) accessory lock actuation command based on the current flow direction in and/or the voltage polarity of the H-bridge to main door actuators (36) lines carrying first actuation command signal (56). Thus, with the current flow being in first direction (114) and the first voltage polarity existing in the H-bridge to main door actuators (36) carrying first actuation command signal (56), gateway controller (68) second determines (216) accessory lock actuation command to be an accessory lock unlock command. Based on the determined accessory lock unlock command, gateway controller (68) uses transceiver (70) to second transmit (220) gateway signal (76) to accessory and/or portal lock controller(s) (64).

In the embodiment, accessory and/or portal lock controller(s) (64) include a PLC (97) and an H-bridge circuit (99). PLC (97) implements an accessory and/or portal lock control scheme for accessory and/or portal locks (24). Transceiver (66) of accessory and/or portal lock controller(s) (64) receives gateway signal (76) from gateway controller (68), and gateway signal (76) is relayed to PLC (97). PLC (97) determines and third transmits (224) to accessory and/or portal lock actuator(s) 60) the second actuation command signal (80) based on the received gateway signal (76). For instance, if a current state of accessory and/or portal locks (24) is locked and gateway signal (76) indicates that user (48) wishes to unlock accessory and/or portal locks (24), PLC (97) initiates a flow of electric current via H-bridge circuit (99) in the first direction (114) to and at the first voltage polarity across terminals of accessory and/or portal lock actuators (60), thereby causing actuators (60) to actuate mechanisms of accessory and/or portal lock actuator(s) (60) from an unlocked position to a locked position.

Also, for instance, if a current state of main door locks (32) is unlocked and user signal (44) indicates that user (48) wishes to lock main door locks (32), PLC (94) initiates a flow of electric current via H-bridge circuit (96) in the second direction (118) to and at a second voltage polarity across terminals of main door lock actuators (36), thereby causing actuators (36) to actuate mechanisms of main door locks (32) from the locked position to the unlocked position.

In the embodiment, accessory and/or portal lock(s) (24) are also in an unlocked state at such times when main door locks (32) are in the unlocked state. Gateway controller (68), operably coupled to vehicle controller (40) as described above, second determines (216) accessory lock actuation command based on the current flow direction in and/or the voltage polarity of the H-bridge to main door actuators (36) lines carrying first actuation command signal (56). Thus, with the current flow being in second direction (118) and the second voltage polarity existing in the H-bridge to main door actuators (36) carrying first actuation command signal (56), gateway controller (68) second determines (216) accessory lock actuation command to be an accessory lock command. Based on the determined accessory lock command, gateway controller (68) uses transceiver (70) to second transmit (220) gateway signal (76) to accessory and/or portal lock controller(s) (64).

In the embodiment, transceiver (66) of accessory and/or portal lock controller(s) (64) receives gateway signal (76) from gateway controller (68), and gateway signal (76) is relayed to PLC (97). PLC (97) determines and third transmits (224) to accessory and/or portal lock actuator(s) 60) the second actuation command signal (80) based on the received gateway signal (76). For instance, if a current state of accessory and/or portal locks (24) is unlocked and gateway signal (76) indicates that user (48) wishes to lock accessory and/or portal locks (24), PLC (97) initiates a flow of electric current via H-bridge circuit (99) in the second direction (118) to and at the second voltage polarity across terminals of accessory and/or portal lock actuators (60), thereby causing actuators (60) to actuate mechanisms of accessory and/or portal lock actuator(s) (60) from the locked position to the unlocked position.

Figure 12:
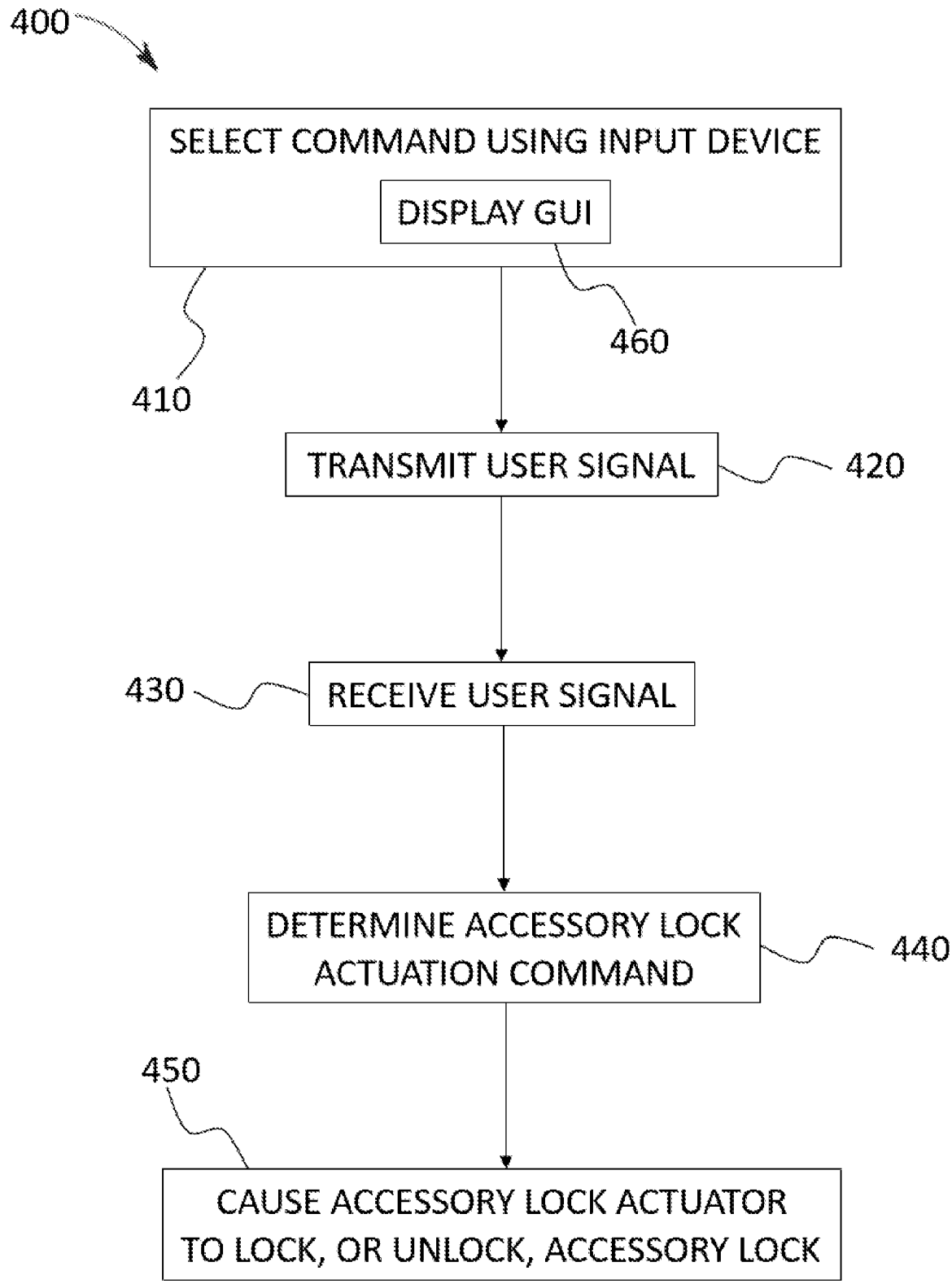
FIG. 12 is a flow chart of a method for remotely locking and unlocking vehicle accessory locks according to an embodiment of the disclosure.

FIG. 12 is a flow chart of a method (400) for remotely locking and unlocking vehicle accessory locks according to an embodiment of the disclosure. Referring to FIGS. 9A, 9B, and 12, in one embodiment, system (2) includes the at least one accessory lock actuator (60) operably coupled to the at least one accessory lock (24), and the at least one accessory lock controller (64) operably coupled to the at least one accessory lock actuator (60). In the embodiment, the transceiver (66) is embodied in a receiver (66), and the system (2) includes an accessory lock control transmitter (33) paired with the receiver (66) for selectively transmitting (420) a user signal (37 or 49) to the receiver (66). Method (400) includes selecting, by a user (48) of the system (2), a command using an input device such as a graphical user interface (41) displayed (46) to user (48) by way of a display device (51). Method (400) includes selectively transmitting (420), to receiver (66), a user signal (e.g., 37 or 49). Method (400) includes receiving (430) the user signal (37 or 49), and determining (440) the accessory lock actuation command (80) based on the received (430) user signal (37 or 49). Method (400) includes causing (450) the accessory lock controller(s) (60) to: lock, or unlock, the accessory lock(s) (24) according to the determined (440) accessory lock actuation command (80).

In an example, system (2) includes a touchpad device (69) which includes the accessory lock control transmitter (33) (e.g., Bluetooth) and a display device (51). Touchpad device (69) may be positioned, or at least positionable, in view of a system (2) user (48), such as removably attached to a portion of a dashboard or center console in the cabin (26) of vehicle (18). Touchpad device (69) may be powered by an internal battery and/or by way of a power cord (39) that enables touchpad device (69) to receive power from vehicle (18) power supply (38) via a power outlet (30) (e.g., a cigarette lighter socket). In the example, the display device (51) of touchpad device (69) displays (460) a graphical user interface (GUI) (41) to the user (48) to enable him or her to select (410) a desired command to be encoded into user signal (37). In the illustrated example of FIGS. 9A and 9B, GUI (41) includes a plurality of buttons that, when touched by user (48), cause touchpad device (69) to implement a corresponding function. GUI (41) includes an unlock button (15) and a lock button (17). GUI (41) may also include a menu button (19) to enable user (48) to select from among a plurality of vehicle (18) accessories that are respectively controllable by the system (2) of the present embodiment. For instance, user (41) may use the menu button (19) to select a tonneau cover (14) handle (8) lock (24), and then touch the unlock button (15), which causes the transmitter

(33) to transmit the corresponding user signal (37). The GUI (41) thus facilitates selectively transmitting (420), by the user (48) and via the transmitter (33), the user signal (37) to the receiver (66) in method (400).

In another example, system (2) includes an accessory lock control application (43) that is executable by a computing device such as a smartphone (35). In this example, the smartphone (35) includes the accessory lock control transmitter (33), which may be a Bluetooth transmitter. The smartphone (35) includes a respective display device (51). Application (43) may be stored in a memory device (not shown) on-board smartphone (35). When executed by a processor (45) of the smartphone (35), the application causes a GUI (41) to be displayed (460) on the display device (51). In this example, the GUI (51) includes the same or similar buttons (15, 17, 19), and for the same or similar functional ends, as described above with reference to the touchpad device (69) GUI (41). For instance, user (41) may use the menu button (19) to select a tonneau cover (14) handle (8) lock (24), and then touch the lock button (15), which causes the transmitter (33) to transmit the corresponding user signal (37) to receiver (66). The GUI (41) thus facilitates selectively transmitting (420), by the user (48) and via the transmitter (33) of smartphone (35), the user signal (37) to the receiver (66) in method (400).

In another embodiment, transmitter (33) of touchpad device (69) and/or smartphone (35) transmits user signal (37 or 49) to gateway controller (68) instead of to receiver (66). In this embodiment, the transmitter (33) of touchpad device (69) and/or smartphone (35) assumes the same or similar functionality of the vehicle (18) key fob (92) as shown and described above with reference to use of system (2) in, for example, method (200). Thus, the user (48) of system (2) may perform method (200) using the application (43) and/or the touchpad device (69) in the absence of being in possession of key fob (92) as, for instance, where user (48) is a vehicle (18) passenger, and the vehicle (18) driver is not located near the vehicle (18) or the passenger. Application (43) and touchpad device (69) thus enhances the flexibility of, and widens the potential user cases for, the user experience for system (2) in practicing method (200).

Embodiments of the above-described devices, systems, and methods for remotely locking and unlocking vehicle accessory locks provide users a number of beneficial technical effects and a more desirable user experience as compared to known vehicle accessory locks. Such benefits include, without limitation, greater convenience, being less expensive and less time-consuming to install, being easier to operate and maintain, requiring fewer modifications to vehicles to which they are attached and/or to the vehicle accessories themselves, and making attaching the vehicle accessories to vehicles less likely to violate vehicle warranty conditions.

The various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A method for remotely locking and unlocking a vehicle accessory of a vehicle, comprising:
    detecting, by a gateway controller and using a gateway electrical line, a transmitted first actuation command signal on a dedicated electrical line between a vehicle controller and a main door actuator of a main door of the vehicle, wherein the vehicle controller provides, based on a user signal, the transmitted first actuation command signal via the dedicated electrical line to the main door actuator to lock or unlock the main door of the vehicle, and wherein the gateway electrical line electrically couples the gateway controller to the dedicated electrical line by tapping into the dedicated electrical line to detect the transmitted first actuation command signal being transmitted on the dedicated electrical line; and
    transmitting, by the gateway controller and based on detecting the transmitted first actuation command signal using the gateway electrical line, a gateway signal to an accessory lock controller operably coupled to an accessory lock actuator, wherein the accessory lock controller is configured to lock or unlock the vehicle accessory based on the gateway signal.

2. The method of claim 1, wherein the vehicle controller is configured to wirelessly receive the user signal from a key fob paired with the vehicle controller.

3. The method of claim 1, wherein the gateway signal is a gateway wireless signal, and wherein transmitting the gateway wireless signal to the accessory lock controller comprises transmitting, by the gateway controller, the gateway wireless signal to the accessory lock controller using a wireless communication protocol.

4. The method of claim 3, wherein the gateway wireless signal is a Bluetooth signal, and wherein the wireless communication protocol is a Bluetooth communication protocol.

5. The method of claim 1, wherein the transmitted first actuation command signal is a main door lock command or a main door unlock command, wherein the main door lock command differs from the main door unlock command based on whether a flow of current between the vehicle controller and the main door lock actuator is positive or negative, wherein the flow of current is positive based on the current flowing in a first direction and the flow of current is negative based on the current flowing in a second direction that is opposite the first direction,
    wherein detecting, by the gateway controller, the transmitted first actuation command signal is based on whether the flow of current is positive or negative.

6. The method of claim 1, further comprising:
    decoding, by the accessory lock controller, the gateway signal; and
    transmitting, by the accessory lock controller and based on the decoded gateway signal, a second actuation command signal to the accessory lock actuator to lock or unlock the vehicle accessory.

7. The method of claim 1, further comprising determining, by the gateway controller, the gateway signal based on the transmitted first actuation command signal, wherein the gateway signal is an accessory lock command or an accessory unlock command.

8. The method of claim 7, further comprising:
    locking, by the accessory lock actuator, an accessory lock based on the transmitted first actuation command signal being the accessory lock command; and unlocking, by the accessory lock actuator, the accessory lock based on the transmitted first actuation command signal being the accessory unlock command.

9. The method of claim 1, further comprising:
receiving, by the vehicle controller, the user signal;
determining, by the vehicle controller, a main door actuation command; and
transmitting, based on the determined main door actuation command and via the dedicated electrical line between the vehicle controller and the main door actuator, the first actuation command signal.

10. A non-transitory computer-readable storage medium having processor-executable instructions stored thereon, wherein the processor-executable instructions, when executed by a processor, facilitate:
detecting, using a gateway electrical line, a transmitted first actuation command signal on a dedicated electrical line between a vehicle controller and a main door actuator of a main door of the vehicle, wherein the vehicle controller provides, based on a user signal, the transmitted first actuation command signal via the dedicated electrical line to the main door actuator to lock or unlock the main door of the vehicle, and wherein the gateway electrical line electrically couples the gateway controller to the dedicated electrical line by tapping into the dedicated electrical line to detect the transmitted first actuation command signal being transmitted on the dedicated electrical line; and
transmitting, based on detecting the transmitted first actuation command signal using the gateway electrical line, a gateway signal to an accessory lock controller operably coupled to an accessory lock actuator, wherein the accessory lock controller is configured to lock or unlock a vehicle accessory based on the gateway signal.

11. A system for remotely locking and unlocking one or more vehicle accessories of a vehicle, the one or more vehicle accessories having at least one accessory lock, the system comprising:
the vehicle, comprising:
one or more main doors having remotely lockable and unlockable main door locks;
one or more main door lock actuators operably coupled to the main door locks; and
a vehicle controller positioned in, or on, the vehicle, wherein the vehicle controller is in communication with a main door actuator of the one or more main door lock actuators using a dedicated electrical line, the vehicle controller configured to:
receive a user signal from a user;
determine, based on the user signal, a main door actuation command; and
transmit, based on the determined main door actuation command and via the dedicated electrical line, a first actuation command signal to the main door lock actuator;
at least one accessory lock actuator operably coupled to the at least one accessory lock;
at least one accessory lock controller operably coupled to the at least one accessory lock actuator; and
a gateway controller configured to:
detect the transmitted first actuation command signal using a gateway electrical line, wherein the gateway electrical line electrically couples the gateway controller to the dedicated electrical line by tapping into the dedicated electrical line to detect the transmitted first actuation command signal being transmitted on the dedicated electrical line; and
transmit, based on detecting the transmitted first actuation command signal using the gateway electrical line, a gateway signal to the at least one accessory lock controller,
wherein the at least one accessory lock controller is configured to transmit, based on the gateway signal, a second actuation command signal to the at least one accessory lock actuator.

12. The system of claim 11, wherein the gateway signal is a gateway wireless signal, and wherein the gateway controller is configured to transmit the gateway wireless signal using a wireless communication protocol.

13. The system of claim 12, wherein the gateway wireless signal is a Bluetooth signal, and wherein the wireless communication protocol is a Bluetooth communication protocol.

14. The system of claim 11, wherein the at least one accessory lock controller is further configured to:
decode the gateway signal; and
transmit the second actuation command signal based on the decoded gateway signal.

15. The system of claim 11, wherein the gateway controller is further configured to determine the gateway signal based on the transmitted first actuation command, wherein the gateway signal is an accessory lock command or an accessory unlock command.

16. The system of claim 15, wherein the at least one accessory lock actuator is configured to lock or unlock the at least one accessory lock based on whether the transmitted first actuation command signal is the accessory lock command or the accessory unlock command.

17. The system of claim 11, wherein the transmitted first actuation command signal is a main door lock command or a main door unlock command,
wherein the main door lock command differs from the main door unlock command based on whether a flow of current between the vehicle controller and the main door lock actuator is positive or negative, wherein the flow of current is positive based on the current flowing in a first direction and the flow of current is negative based on the current flowing in a second direction that is opposite the first direction,
wherein the gateway controller is configured to detect the transmitted first actuation command signal based on whether the flow of current is positive or negative.

18. The system of claim 11, further comprising:
a user device executing an accessory lock control application, wherein the accessory lock control application causes a graphical user interface (GUI) to be displayed on the user device, and wherein the user device is configured to transmit the user signal based on user input associated with the GUI.

19. The system of claim 11, further comprising: a touchpad, the touchpad comprising a display device configured to display a graphical user interface (GUI) to facilitate transmitting, based on user input, the user signal to the vehicle controller.

* * * * *